United States Patent [19]

Budecker

[11] Patent Number: 5,094,599

[45] Date of Patent: Mar. 10, 1992

[54] RADIAL PISTON PUMP, IN PARTICULAR FOR AUTOMOTIVE VEHICLE BRAKE SYSTEMS WITH ANTI-LOCK CONTROL

[75] Inventor: Ludwig Budecker, Frankfurt am Main, Fed. Rep. of Germany

[73] Assignee: Alfred Teves GmbH, Frankfurt am Main, Fed. Rep. of Germany

[21] Appl. No.: 731,382

[22] Filed: Jul. 16, 1991

Related U.S. Application Data

[63] Continuation of Ser. No. 322,806, Mar. 13, 1989, abandoned.

[30] Foreign Application Priority Data

Mar. 17, 1988 [DE] Fed. Rep. of Germany ....... 3808901

[51] Int. Cl.$^5$ .............................................. F04B 21/02
[52] U.S. Cl. ...................................... 417/534; 303/84
[58] Field of Search ...................... 417/273, 540, 542; 303/87

[56] References Cited

U.S. PATENT DOCUMENTS

| | | | |
|---|---|---|---|
| 2,318,128 | 5/1943 | Tabb | 417/542 X |
| 2,929,333 | 3/1960 | Harry | 417/542 |
| 3,900,276 | 8/1975 | Dilworth | 417/542 |
| 4,188,073 | 2/1980 | Ishikawa et al. | 303/87 |
| 4,850,825 | 7/1989 | Budecker | 417/538 |

FOREIGN PATENT DOCUMENTS 1384085 2/1975 United Kingdom ................ 417/273

*Primary Examiner*—Richard A. Bertsch
*Assistant Examiner*—Charles G. Freay
*Attorney, Agent, or Firm*—Robert P. Seitter; J. Gordon Lewis

[57] ABSTRACT

A radial piston pump for a brake system in automotive vehicles. The resulting system produces little noise and is split up into various circuits. The resulting system provides damping of the pressure vibrations caused by the pump pistons. The individual channels are furnished with permanently allocated damping chambers. These damping chambers are combined with the associated outlet valves to form a replaceable construction unit (damping-chamber valve) which is adapted to a given application.

7 Claims, 2 Drawing Sheets

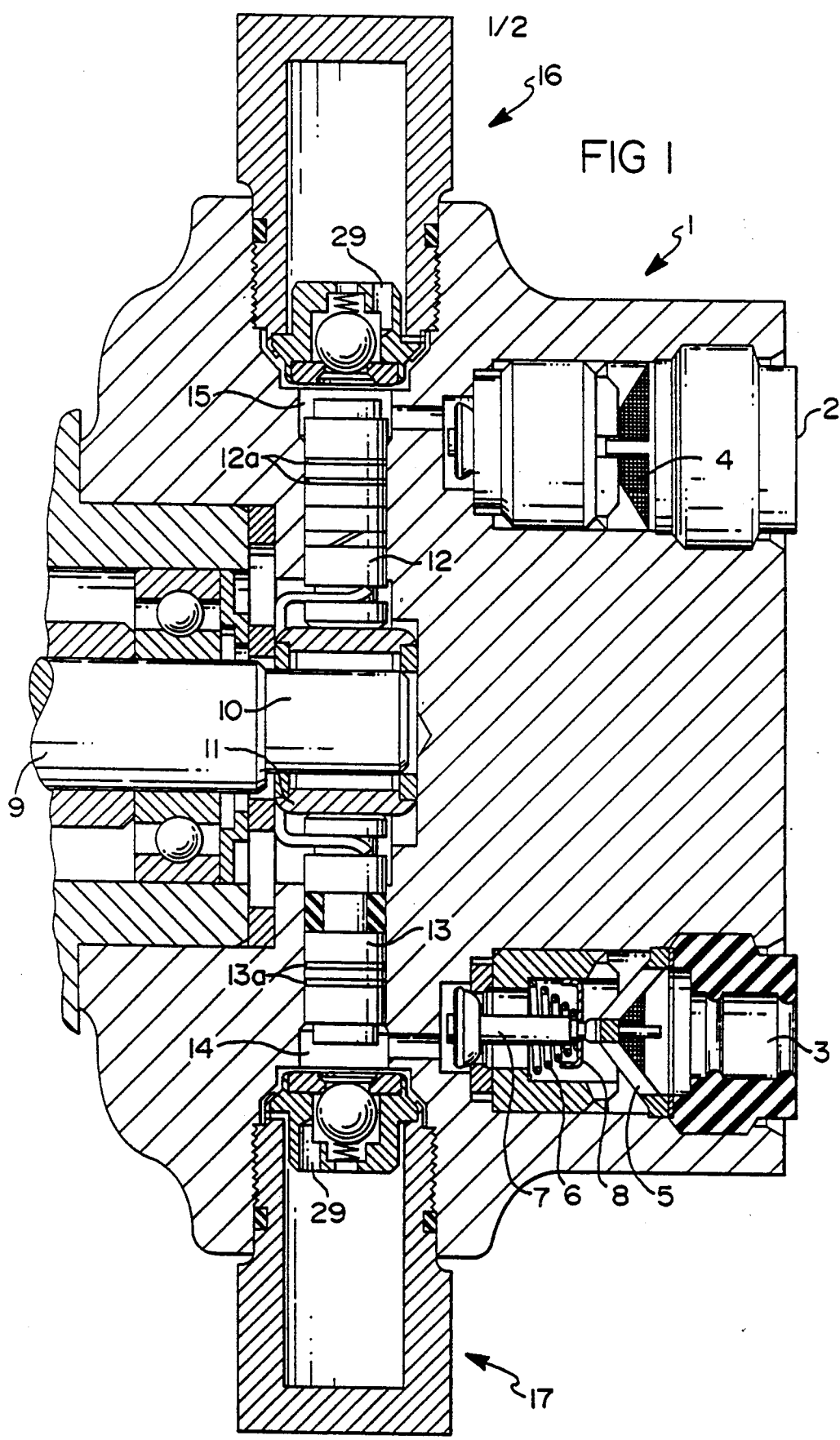

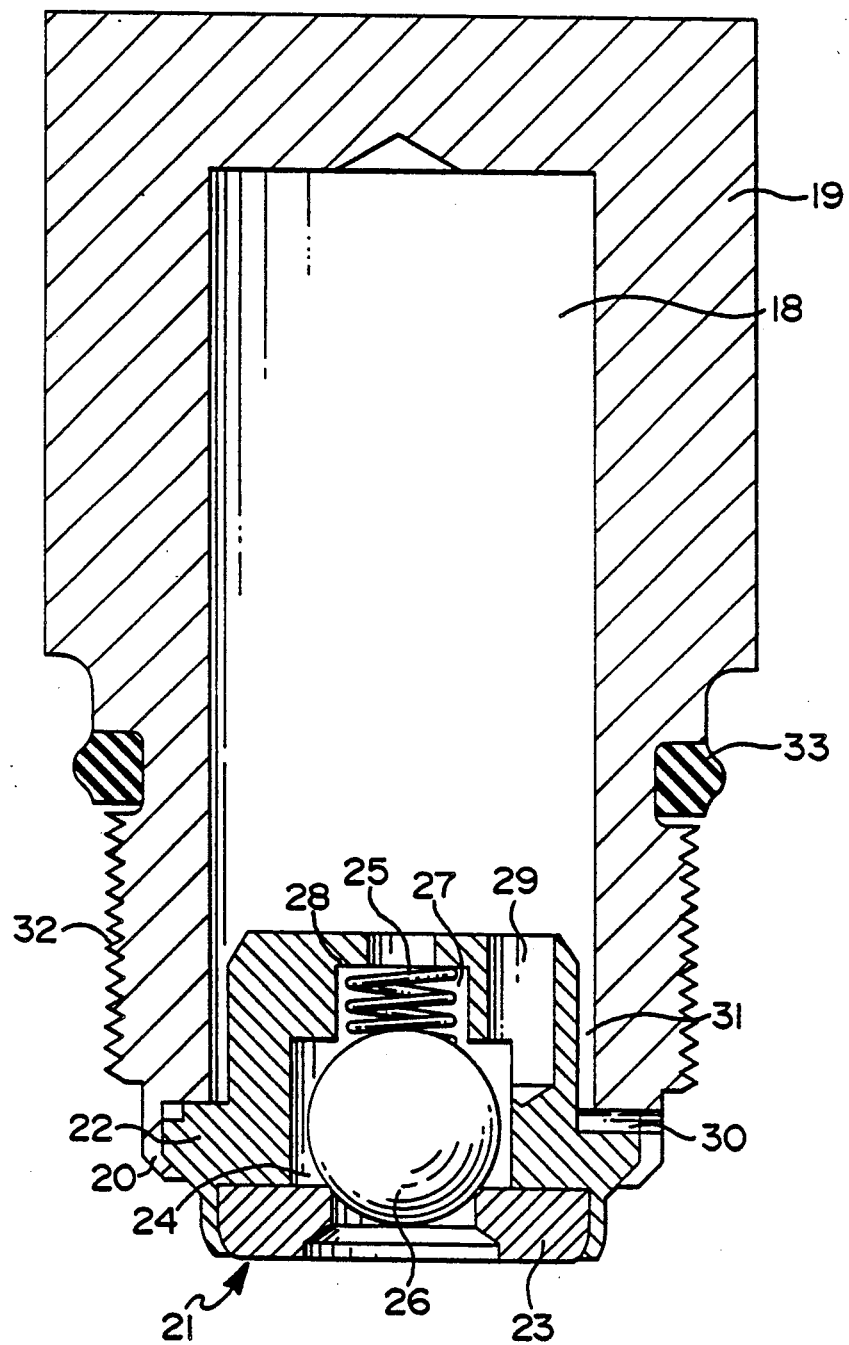

RADIAL PISTON PUMP, IN PARTICULAR FOR AUTOMOTIVE VEHICLE BRAKE SYSTEMS WITH ANTI-LOCK CONTROL

This application is a continuation of application Ser. No. 07/322,806 filed Mar. 13, 1989, now abandoned.

This invention relates to a pump for use in automotive vehicles having brake systems with anti-lock control and/or traction slip control, the pump is required for developing the hydraulic pressure necessary for regulating the brake system.

A pump of this type is described in German patent publication 14 53 663. A problem occurs in the use of this known radial piston pump in that pressure variations are transmitted onto the brake pedal. The vibrations resulting therefrom on the brake pedal are unpleasant to the operator, particularly when no accumulator is provided in the brake system.

It is known from German patent application 28 24 239 to connect the outlets of a radial piston pump with a collecting chamber which is arranged inside the pump housing and which functions as an accumulator and, also acts as a vibration damper. It is disadvantage of this known arrangement that the space required for the damping of vibrations is of considerable size. Further, in many cases it is necessary for increasing reliability in the brake systems to separately furnish the individual brake circuits with pressure. The known pump arrangement does not provide this desirable function.

SUMMARY OF THE INVENTION

It is an object of the present inventor to provide for damping of the pump vibrations in a radial piston pump of the typed described in a simple and space-saving fashion, and which easily is adaptable to a given application.

This object is achieved in that each of the individual outlet valves is furnished with a damping chamber which directly adjoins the outlet channel of the valve housing and thus damps the vibrations close to the source thereof. It is therefore possible to permanently allocate to each of the individual pistons a separate pressure circuit so that, even upon failure of one pump circuit, the remaining pump circuit remains fully effective. A particularly simple design of the valve in one preferred embodiment results from using a spherical valve member which does not require centering.

In order to accelerate the valve operation, an arrangement can be provided wherein no pressure accumulation in the chamber disposed above the valve member and accommodating the closure spring inhibits opening of the valve member due to the pressure caused by the piston. Moreover, likewise the short direct connection between the volume of the pressure chamber and the application surface of the valve member relative to the spiral spring favors more ease of motion of the valve ball in the closing direction which is not hampered by pressure occurring below atmospheric pressure in the spring chamber when the ball closes.

To prevent that the ball shuts off the hydraulic fluid from the piston chamber into the damping chamber when in its opened position, a further embodiment of the present invention provides a design wherein the direction of movement of the ball is separated from the direction of movement of the pressurized pressure fluid, whereby a diminution of the pressure vibrations also is achieved.

An improvement of the damping effect can be accomplished by using an arrangement wherein the connecting path between damping chamber and outlet opening the reverse direction is utilized rather than a connecting path between valve and damping chamber. Because of this reversed direction of the pumped pressure fluid, additional damping of the pressure vibrations can be attained. The connecting path between damping chamber and outlet opening of the pump encompasses the connection between valve and damping chamber annularly, whereby smaller spatial dimensions can be provided.

It is a frequent requirement to adjust the damping of vibrations of the pressure fluid as one desires. The reason is that, in many cases, a certain vibration of the brake pedal will give the operator a direct indication at the effectiveness of the anti-lock control. To this end, an alternate embodiment of the present invention provides a unit composed of valve and damping chamber resulting therefrom. In this unit, the behavior of the subassemblies are conformed so that, depending on the space available and the damping desired, the appropriate construction unit can be attached in the pump, and preferably screwed therein. This construction unit may be equipped with a negligible damping chamber in the event that greater vibrations are desired to occur on the brake pedal. A still further embodiment provides that a sleeve shaped or funnel-shaped extention terminates into the damping chamber and thereby causes turbulences in the front of vibrations. Additional damping can be provided wherein annular chamber, starting from a wide inlet opening, is narrowed by steps and thus contributes to damping of the fronts of vibrations.

The present invention an be arranged to completely isolate the two pump circuits from each other. That is, not only the outlets of the pump, but also the inlets thereof extend in a spatially isolated fashion so that the return line for the individual pump circuits also is separated.

BRIEF DESCRIPTION OF THE DRAWING

An embodiment of this invention will be described in greater detail in the following detailed description with reference to the accompanying drawing, in which:

FIG. 1 is an embodiment of the radial piston pump in accordance with the present invention; and, FIG. 2 shows, on an enlarged scale, a construction unit of the radial piston pump according to FIG. 1 comprising a valve and damping chamber.

DETAILED DESCRIPTION OF A PREFERRED EMBODIMENT

The radial piston pump generally shown in FIG. 1 is similar to the pump described in U.S. Pat. No. 4,850,825 and therefore a description of this pump may be had by reference to that document so that the details thereof need not be fully repeated herein.

FIG. 1 shows a radial piston pump 1 having two separate inlet openings 2 and 3. A filter 4 and/or 5 which is provided with four support legs is placed in the inlet openings, on which filter a spring 6 is supported which retains a valve 7 in its closed position. The inlet valve 7 extends through a guide plate 8 furnished with three legs. At their bottom inner surface, the filters 4 and 5 are equipped with an annular plastic reinforcement so that the filter net is impermeable at that point. A shaft 9 driven by an electric motor includes an eccentric 10 which, by way of a roller bearing, acts upon a guide ring 11.

The radial piston pump 1 includes two pistons 12, 13 which are held by a spring washer to bear against the actuating ring 11. Pistons 12 and 13 include conventional ring seals 12a and 13a as is known in the art. Due to the effect of the eccentric 10, the two pistons 12 and 13 are moved to and fro respectively opposite to their longitudinal axis. This way, the pressure fluid introduced by way of the inlet openings 2, 3 into the compression spaces 14, 15 is compressed. On top of the pistons 12, 13, each unit composed of valve and damping chamber is screwed into the housing of the pump which unit is hereinafter described as damping-chamber valve 16 and/or 17.

The damping chamber valve shown in FIG. 2 comprises a damping chamber 18, while the bottom end of the chamber housing 19 in FIG. 2 undetachably fixes a valve housing 21 by way of a beaded edge 20 or any other suitable measure. Valve housing 21 is composed of a housing bowl 22 into which a housing cover 23 is beaded. Housing bowl 22 and housing cover 23 enclose a valve chamber 24 in which a spherical valve member 26 is pressed by a spiral spring 25 sealingly against the edge of a connecting aperture in the housing cover 23. In the screwed-in condition, this connecting aperture communicates with the compression spaces 14 and/or 15 shown in FIG. 1.

The valve chamber 24 passes over into a stepped bore 27 on whose shoulder 28 the spiral spring 25 is supported. This stepped bore establishes a connection to the damping chamber 18 which prevents pressure accumulation in the space of the spiral spring 25 so that the movability of the valve member 26 in the axial direction of the damping chamber 18 is supported, that is, lifting or seating of the valve member 26 is not hindered by pressure in excess of and/or below atmospheric pressure in the space of the spiral spring 25. This detrimental pressure in excess of and/or below atmospheric pressure is prevented owing to the pressure compensation towards the damping chamber 18. The valve chamber 24 communicates with the pressure chamber 18 by way of outlet bore 29 so that, when the valve member has opened and abuts on the edge of the stepped bore, the pressure fluid propagates by way of the connecting aperture, the pressure chamber 24 and the outlet bore 29 into the damping chamber 18.

For improving the damping effect, the outlet bore 29 can be provided with an extended funnel in order to promote the compensation of the pressure differences and thus damping of the pressure waves by the abrupt pressure relief in the damping chamber 18. Another measure for aiding the damping can be provided by placing the outlet opening 30 on the bottom end of the housing 19 in FIG. 2 in opposition to the direction of flow in the outlet bore 29 rather than on the upper end of the chamber housing 19 as shown in FIG. 2. To connect the pressure chamber 18 to the outlet opening 30 of the pump, an annular chamber 31 is established between the inner peripheral surface of the housing 19 and the outer peripheral surface of the housing bowl 22. For further assisting the damping effect, this annular chamber can be further narrowed by steps towards the outlet opening 30. By way of a thread 32, the damping chamber valve 16 and/or 17 is screwed with or into the housing of the pump, while maintaining the provision of a corresponding seal 33.

What is claimed is:

1. A radial piston pump, for a hydraulic anti-lock brake system comprising in combination at least one pair of radially extending pistons which alternatingly perform working strokes and are each mounted in a stationary cylinder block formed with working chambers, a respective working chamber at one end of each piston, inlet and outlet valves in communication with each of said working chambers and with an eccentric shaft rotating to cause radial movements of the pistons to create a pumping action, and wherein each of the outlet valves includes a valve housing having an inlet port in communication with said working chamber, and a valve element movable between open and closed positions in said valve housing, means urging said valve element to said closed position; an outlet valve outlet passage extending to receive flow from said inlet port with said valve element in said open position, a fixed volume damping chamber adjacent to each of said outlet valves, into which said outlet passage of said valve housing directly enters, and, a damping chamber exit passage exiting each of said damping chambers and connected to said hydraulic brake system, each of said fixed volume damping chambers formed in a respective damping chamber housing sleeve having a bore therein closed at one end and comprising said fixed volume damping chamber, said outlet valve housing mounted within the other open end of said housing sleeve, with said outlet valve outlet passage directed into said damping chamber toward said closed end of said sleeve bore.

2. The pump as claimed in claim 1 wherein said valve element of each outlet valve comprises a spherical valve ball.

3. The pump as claimed in claim 2 wherein each of said balls is urged by a closure spring towards its closing position, said valve housing including a stepped bore passing into said damping chamber and having a shoulder formed therein, said closure spring seated on said shoulder of said stepped bore in said valve housing.

4. The pump as claimed in claim 1 wherein said outlet valve outlet passage is laterally offset in relation to the axis of said ball valve and in parallel relationship thereto.

5. The pump as claimed in claim 1 wherein each of said outlet valve housings is of substantially cylindrical shape, and wherein each of said sleeve bores defining a respective said damping chamber is substantially cylindrical, with each of said outlet valve housings received in a respective sleeve bore with an annular space therebetween defining said damping chamber exit passage.

6. The pump according to claim 1 wherein each of said outlet valves outlet passage extends in the opposite direction from said associated damping chamber exit passage.

7. The pump according to claim 1 wherein the volume of each of said damping chambers is substantially greater than said associated working chamber.

* * * * *